US007094730B2

(12) United States Patent
LaBarge et al.

(10) Patent No.: US 7,094,730 B2
(45) Date of Patent: Aug. 22, 2006

(54) GAS TREATMENT DEVICE, METHODS FOR MAKING AND USING THE SAME, AND A VEHICLE EXHAUST SYSTEM

(75) Inventors: William J. LaBarge, Bay City, MI (US); Joachim Kupe, Davisburg, MI (US); Conrad Anderson, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 475 days.

(21) Appl. No.: 10/284,895

(22) Filed: Oct. 31, 2002

(65) Prior Publication Data

US 2004/0086440 A1   May 6, 2004

(51) Int. Cl.
   *B01J 23/56* (2006.01)
(52) U.S. Cl. .................................... 502/332
(58) Field of Classification Search ............... None
   See application file for complete search history.

(56) References Cited

U.S. PATENT DOCUMENTS

| | | | | |
|---|---|---|---|---|
| 4,962,214 A | | 10/1990 | Villacorta et al. ............ 556/33 |
| 5,170,624 A | * | 12/1992 | Cornelison et al. .......... 60/300 |
| 5,179,126 A | | 1/1993 | Wurtman et al. ........... 514/646 |
| 5,410,876 A | * | 5/1995 | Simko ......................... 60/288 |
| 5,477,905 A | | 12/1995 | Knapp et al. ................. 164/61 |
| 5,512,251 A | * | 4/1996 | Brunson et al. ............ 422/174 |
| 5,547,467 A | | 8/1996 | Pliquett et al. .............. 604/20 |
| 5,565,215 A | | 10/1996 | Gref et al. .................. 424/501 |
| 5,567,397 A | * | 10/1996 | Le Gal et al. .............. 422/192 |
| 5,580,533 A | * | 12/1996 | Kivioja et al. ........... 423/213.5 |
| 5,633,711 A | | 5/1997 | Nelson et al. .............. 356/318 |
| 5,703,001 A | * | 12/1997 | Rizkalla ...................... 502/347 |
| 5,720,901 A | * | 2/1998 | De Jong et al. ............ 252/373 |
| 5,755,841 A | | 5/1998 | Boucot et al. ............. 48/127.7 |
| 5,815,398 A | | 9/1998 | Dighe et al. ........... 364/478.05 |
| 5,823,761 A | * | 10/1998 | Euzen et al. ..................... 43/7 |
| 5,830,822 A | * | 11/1998 | Euzen ........................ 502/355 |
| 5,849,659 A | * | 12/1998 | Tanaka et al. .............. 502/324 |
| 5,850,734 A | * | 12/1998 | Ketcham ..................... 60/274 |
| 5,915,951 A | | 6/1999 | Euzen et al. ................... 431/7 |
| 6,159,430 A | | 12/2000 | Foster, et al. |
| 6,242,263 B1 | * | 6/2001 | Faber et al. ................. 436/143 |
| 6,254,842 B1 | * | 7/2001 | Hu et al. ................. 423/213.5 |
| 6,338,827 B1 | | 1/2002 | Nelson |
| 6,354,903 B1 | | 3/2002 | Nelson |
| 6,361,821 B1 | | 3/2002 | Anderson et al. |
| 6,391,822 B1 | | 5/2002 | Dou et al. |
| 6,438,839 B1 | | 8/2002 | Hardesty et al. |
| 6,455,463 B1 | | 9/2002 | Labarge et al. |
| 6,464,945 B1 | | 10/2002 | Hemingway |
| 6,464,947 B1 | | 10/2002 | Balland |
| 6,497,847 B1 | | 12/2002 | Foster et al. |
| 6,532,659 B1 | | 3/2003 | DeSousa et al. |
| 6,544,924 B1 | * | 4/2003 | Jackson et al. ............ 502/251 |
| 6,591,497 B1 | | 7/2003 | Foster et al. |
| 6,605,259 B1 | | 8/2003 | Henry |
| 6,623,704 B1 | | 9/2003 | Roth |
| 6,624,113 B1 | | 9/2003 | Labarge et al. |
| 6,643,928 B1 | | 11/2003 | Hardesty et al. |
| 6,692,551 B1 | * | 2/2004 | Wernholm et al. ............ 95/146 |
| 6,774,080 B1 | * | 8/2004 | LaBarge et al. ............ 502/170 |
| 6,832,473 B1 | * | 12/2004 | Kupe et al. .................... 60/286 |
| 2002/0068679 A1 | * | 6/2002 | Yan et al. ...................... 502/66 |
| 2002/0132727 A1 | * | 9/2002 | Labarge et al. ............... 502/73 |

FOREIGN PATENT DOCUMENTS

| | | |
|---|---|---|
| WO | WO 96/31434 | 10/1996 |
| WO | WO 98/15500 | 4/1998 |
| WO | WO 98/17389 | 4/1998 |
| WO | WO 98/18884 | 5/1998 |
| WO | WO 98/46353 | 10/1998 |
| WO | WO 98/48456 | 10/1998 |
| WO | WO 01/14060 A2 | 3/2001 |

OTHER PUBLICATIONS

"Kinetic and Mechanism of Forfmation of Tricalcium Aluminate, Ca3Al2O6", B.M. Mohamed, et al., Article in Press, Oct. 18, 2001, 10 pages.

Lin-chiuan Yan et al "Synthesis and characterization of aerogel-derived cation-substituted barium hexaaluminates" Applied Catalysis A: General 171 (1998) pp. 219-228.

Sadamori "Application concepts and evaluation of small-scale catalytic combustors for natural gas" Catalysis Today 47 (1999) pp. 325-338.

Johansson et al "Catalytic combustion of gasified biomasses over MN-substituted hexaaluminate for gas turbine applications" Catalysis Today 45 (1998) pp. 159-165.

Johannson et al "Catalytic combustion of gasified biomass over hexaaluminate catalysts: influence of palladium loading and ageing" Applied Catalysis A: General 182 (1999) pp. 199-208.

Artizzu-Duart et al "Catalytic combustion of methane on substituted barium hexaaluminates" Catalysis Today 59 (2000) pp. 163-177.

Artizzu-Duart et al "Catalytic combustion of methane over copper- and manganese-substituted barium hexaaluminates" Catalysis Today 54 (1999) pp. 181-190.

Xu et al "Catalytic properties of Ni modified hexaaluminates $LaNi_yAl_{12-y}O_{19-\delta}$ for $CO_2$ reforming of methane to synthesis gas" Applied Catalysis A: General 198 (2000) pp. 267-273.

(Continued)

Primary Examiner—Colleen P. Cooke
(74) Attorney, Agent, or Firm—Paul L. Marshall

(57) ABSTRACT

Gas treatment devices and vehicle exhaust systems are disclosed herein. In one embodiment, the vehicle exhaust system, comprises: an engine, a gas treatment device disposed downstream from the engine, the gas treatment device comprising a housing, a substrate disposed within the housing, the substrate comprising a catalyst and a hexaaluminate comprising a catalyst stabilizer disposed in a hexaaluminate crystal structure.

10 Claims, No Drawings

OTHER PUBLICATIONS

Kikuchi et al "Thick-film coating of hexaaluminate catalyst on ceramic substrates and its catalytic activity for high-temperature methane combustion" Applied Catalysis A: General 218 (2001) pp. 101-111.

Pocoroba et al "Ageing of palladium, platinum and manganese-based combustion catalysts for biogas applications" Catalysis Today 59 (2000) pp. 179-189.

Inoue et al "Thick-film coating of hexaaluminate catalyst on ceramic substrates for high-temperature combustion" Catalysis Today 47 (1999) pp. 181-190.

-L. Jang et al "Catalytic oxidation of methane over hexaaluminates and hexaaluminate-supported Pd catalysts" Catalysis Today 47 (1999) pp. 103-113.

Groppi et al "Preparation, characterization and catalytic activity of pure and substituted La-Hexaaluminate systems for high temperature catalytic combustion" Applied Catalysis B: Enviromental 35 (2001) pp. 137-148.

Han et al "Synthesis of manganese substituted hexaaluminate and its fabrication into monolithic honeycombs for catalytic combustion" Materials Science and Engineering A302 (2001) pp. 286-293.

* cited by examiner

GAS TREATMENT DEVICE, METHODS FOR MAKING AND USING THE SAME, AND A VEHICLE EXHAUST SYSTEM

TECHNICAL FIELD

The disclosure relates to a gas treatment device, and especially relates to a gas treatment device comprising a substrate with a hexaaluminate.

BACKGROUND OF THE INVENTION

Gas, e.g., exhaust gas, treatment devices such as catalytic converters, evaporative emissions devices, hydrocarbon scrubbing devices, diesel particulate traps, non-thermal plasma reactors, and the like, are employed in various applications to physically and/or catalytically treat environmentally unfriendly gas emissions. Such gas treatment devices incorporate a substrate, support, monolith, or brick, which includes a catalyst material coated thereon. A mounting device such as a mat support material comprising an intumescent material, non-intumescent material, or a combination of both, is disposed about the substrate forming a mat support material/substrate subassembly.

In order to meet the stringent requirements imposed by regulations governing the emission of pollutants, gas treatment devices are designed such that they can withstand higher temperatures over longer periods, e.g., so that they can be disposed in a close coupled (e.g., about 12 inches from the manifold) or manifold location where temperatures reach and exceed about 1,200° C. The catalysts of these gas treatment devices often degrade and their catalytic performance is reduced at temperatures greater than 1,000° C. Of the possible causes for this degradation in performance, sintering of the support upon which the catalyst is deposited, and sintering of the catalyst's active phase and/or encapsulation thereof by the support are among those most frequently blamed.

SUMMARY OF THE INVENTION

Disclosed herein are a gas treatment devices and vehicle exhaust systems, and methods for using the same. In one embodiment, the gas treatment device comprises: a housing, a substrate disposed within the housing, the substrate comprising a catalyst selected from the group consisting of platinum, palladium, rhodium, ruthenium, iridium, gold, silver, and combinations comprising at least one of these catalysts, and a hexaaluminate comprising a crystal stabilizer disposed in a hexaaluminate crystalline structure.

In another embodiment, the gas treatment device comprises: a housing, a metal foil disposed within the housing, the metal foil comprising coating comprising a hexaaluminate comprising a crystal stabilizer disposed in a hexaaluminate crystalline structure and a retention material disposed between the housing and the substrate.

In one embodiment, the vehicle exhaust system, comprises: an engine, a gas treatment device disposed downstream from the engine, the gas treatment device comprising a housing, a substrate disposed within the housing, the substrate comprising a catalyst and a hexaaluminate comprising a catalyst stabilizer disposed in a hexaaluminate crystal structure.

In one embodiment, the method for using a gas treatment device, comprises: introducing a gas to a gas treatment device comprising a substrate disposed within the housing, the substrate comprising a catalyst and a hexaaluminate comprising a crystal stabilizer disposed in a hexaaluminate crystalline structure and reducing a concentration of at least one component in the gas.

In one embodiment, the method for making a gas treatment device, comprises: disposing a catalyst with a hexaaluminate comprising a crystal stabilizer disposed in a hexaaluminate crystalline structure onto a substrate, disposing the substrate in a housing having an inlet for receiving gas and an outlet, and disposing a retention material between the housing and the substrate The above-described and other features will be appreciated and understood by those skilled in the art from the following detailed description, drawings, and appended claims.

DESCRIPTION OF THE PREFERRED EMBODIMENT

Gas treatment devices (otherwise know as exhaust emission control devices, such as catalytic converters, nitrogen oxide (NOx) adsorbers and converters, sulfur traps, plasma reactors (e g., non-thermal plasma reactors) typically comprise a housing disposed around a substrate comprising a catalyst. Disposed between the housing and the substrate is a retention material. The device is disposed in an exhaust system of a vehicle, downstream of the engine, in the underfloor, close-coupled, or manifold position. In the under floor position, e.g., downstream from the engine where the exhaust gas temperatures typically do not exceed about 850° C. in the device, a catalyst is disposed on ceramic or similar substrate. In contrast, the close-coupled position (e.g., upstream from the under floor position and near the engine manifold where temperatures in the device can reach about 900° C.), and the manifold position (e.g., integral with the engine exhaust manifold where temperatures are typically about 1,000° C. to about 1,100° C. or so), ceramic substrates are not employed. In temperatures exceeding about 1,000° C. and close to engine air flow pulsations, ceramic substrates degrade and crumble. Consequently, in the close coupled and manifold positions, the substrate typically comprises a metal, often in the form of a foil or the like. The catalyst on the metal foil is a precious metal or similar catalyst disposed on an alumina scale covering a stainless steel foil. To enhance the adhesion of the catalyst to the substrate, e.g., the metal foil, the metal oxide scale can be replaced or combined with a hexaaluminate scale.

Hexaaluminates are crystalline, porous structures that are able to withstand high temperatures (e.g., temperatures less than or equal to about 1,350° C.) without sintering, thereby making them an ideal candidate as a catalyst in reformers. Even at temperatures of up to about 1,600° C., hexaaluminates can have a surface area of 20 square meters per gram ($m^2/g$). A hexaaluminate is a very specific compound with a specific crystal structure, e.g., with a barium ion aligned in the C-axis of the hexaaluminate crystal structure. With a crystal stabilizer, the C-axis of the hexaaluminate is restrained such that the structure cannot collapse even at very high temperature. For example, barium hexaaluminate is one very specific compound ($BaAl_{12}O_{19}$), with a barium content being 17.9 wt %. In contrast to hexaaluminates, aluminates are not specific structures, they are random mixtures; e.g., barium aluminates have barium in randomized locations, not necessarily in the C-axis. Barium aluminate describes many compounds such as, but not limited to, $BaAl_2O_4$. The barium content of a barium aluminate can range from less than about 1 wt % to more than about 60 wt %.

A crystal stabilizer is disposed within the hexaaluminate crystalline structure to inhibit crystal collapse at high temperatures. The crystal stabilizer can comprise Group Ia metals, Group IIa metals, rare earth metals, active metals (e.g., Group VIII metals, precious metals, and the like), and the like, as well as combinations comprising one or more of the foregoing crystal stabilizers. Group IIa stabilized hexaaluminates, in order of preference of the crystal stabilizers, may comprise barium (forming, e.g., $BaAl_{12}O_{19}$), strontium (forming, e.g., $SrAl_{12}O_{19}$) and magnesium (forming, e.g., $MgAl_{12}O_{19}$). Some rare earth stabilized hexaaluminates, in order of preference of the crystal stabilizers, may comprise lanthanum (forming, e.g., $LaAl_{11}O_{18}$), praseodymium (forming, e.g., $PrAl_{11}O_{18}$), and cerium (forming, e.g., $CeAl_{11}O_{18}$). An example of a combination of Group IIa and rare earths stabilizers particularly includes barium-lanthanum (forming, e.g., $Ba_{0.5}La_{0.7}Al_{11}O_{18}$) and strontium-lanthanum (forming, e.g., $Sr_{0.8}La_{0.2}Al_{11}O_{18}$). Other possible stabilizers include hafnium, neodymium, scandium, yttrium, zirconium, and the like. Combinations of one or more of any of the above crystal stabilizers can also be employed.

The base metal activated and stabilized hexaaluminates, may include the base metals manganese, nickel, iron, and the like, rare earths, and Group IIa stabilizers, and combinations comprising one or more of the foregoing base metals. For example, in order of preference, lanthanum-manganese (forming, e.g., $LaMnAl_{11}O_{19}$), barium-manganese (forming, e.g., $Ba_xMn_{1-x}Al_{12}O_{19}$), lanthanum-nickel (forming, e.g., $LaNiAl_{11}O_{19}$), barium-nickel (forming, e.g., $Ba_xNi_{1-x}Al_{12}O_{19}$), lanthanum-iron (forming, e.g., $LaFeAl_{11}O_{19}$), and barium-iron (forming, e.g., $Ba_xFe_{1-x}Al_{12}O_{19}$).

The precious metal activated and stabilized hexaaluminates may include precious metals (e.g., platinum, palladium, rhodium, ruthenium, iridium, gold, and silver, and the like), base metals (e.g., manganese, nickel, iron, and the like), and the like, and combinations comprising one or more of the foregoing catalyst stabilizers.

Not to be limited by theory, it is believed that the crystal stabilizer is disposed in a particular location within the crystalline structure (i.e., the C-axis), such that, upon heating, the crystal stabilizer inhibits destabilization of the crystalline structure (e.g., collapsing of the crystalline structure). Consequently, crystal stabilizers having larger atomic sizes are preferred. Preferably, the crystal stabilizer comprises barium, strontium, and/or lanthanum with barium especially preferred.

It should be noted that the crystal stabilizer is introduced into the hexaaluminate crystalline structure as an organometallic. When it reacts with the hexaaluminate, the crystal stabilizer(s) enters the crystalline structure and bonds such that it shares oxygen with the crystal structure. Preferably, the crystal stabilizer is present in the crystalline structure in an amount of about 0.01 weight percent (wt %) to about 19 wt %, based upon the total weight of the stabilized hexaaluminate.

Depending upon the crystal stabilizer incorporated into the crystalline structure, avoidance of some materials can be advantageous. Some materials, which may be avoided, include zinc, titanium, silicon, niobium, boron, germanium and phosphorus. These materials migrate to the surface of the precious metals and inhibit the ability of the exhaust gasses to reach the active metal sites. In some cases, e.g., when ruthenium is incorporated into the crystalline structure, nickel, cobalt, iron, manganese, chromium, and copper are also avoided. Rhodium is preferred for its hydrogen formation activity. Base metals such as nickel, cobalt, iron, manganese, chromium, and copper "poison" or reduce such activity of the rhodium, ruthenium. When base metals are included, such as manganese hexaaluminate, ruthenium is not included into the structure. Furthermore, support-fluxing agents such as lithium, sodium, potassium, rubidium, cesium, and beryllium, can be avoided. Alkaline earths enable the loss of surface area of the hexaaluminate structure.

The hexaaluminate can be formed in various fashions by combining the crystal stabilizer (in the form of an organometallic) with an organometallic aluminum, with precursors (e.g., organometallics) that form the hexaaluminate at low temperatures (e.g., less than or equal to about 500° C.) preferred. Possible organometallic aluminums include aluminum isopropoxide, aluminum hydroxide, aluminum methoxide, aluminum n-butoxide, aluminum ethoxide, and the like, as well as combinations comprising one or more of the foregoing compounds, with aluminum isopropoxide preferred. Possible crystal stabilizer organometallics comprise crystal stabilizer 2-ethylhexanoates, crystal stabilizer isopropoxides, and the like, as well as combinations comprising one or more of the foregoing organometallics. For example, the crystal stabilizer organometallic can be lanthanum 2-ethylhexanoate, barium 2-ethylhexanoate, strontium 2-ethylhexanoate, manganese 2-ethylhexanoate, cobalt 2-ethylhexanoate, iron 2-ethylhexanoate, cerium 2-ethylhexanoate, ruthenium 2-ethylhexanoate, palladium 2-ethylhexanoate, and the like, as well as combinations comprising one or more of the foregoing organometallics. Examples of preferred hexaaluminates include rhodium hexaaluminate, barium hexaaluminate, strontium hexaaluminate, lanthanum hexaaluminate, and ruthenium-barium hexaaluminate.

For example, hexaaluminates can be formed by mixing aluminum isopropoxide (soluble organometallic aluminum) and lanthanum isopropoxide (soluble organometallic crystal stabilizer) in a solvent (e.g., water). The mixed material can be fired to 500° C. to form the hexaaluminates crystalline structure. These hexaaluminates (e.g., lanthanum hexaaluminates) will maintain a surface area of greater than or equal to about 100 meters squared per gram ($m^2/g$) at 1,300° C., with greater than or equal to about 125 $m^2/g$ readily attained, and even greater than or equal to about 150 $m^2/g$ possible.

Although hexaaluminates can be formed by fusion, e.g., combining inorganic materials at very high temperatures (e.g., greater than or equal to about 1,350° C.), these hexaaluminates are not preferred due to their low surface areas, e.g., less than or equal to about 20 $m^2/g$. For example, a hexaaluminate can be formed by reacting manganese oxide and aluminum oxide at greater than or equal to about 1,400° C. The manganese oxide crystal structure and the aluminum oxide crystal structure are already formed. To insert manganese into the aluminum oxide structure and change that structure to a hexaaluminate structure, a great deal of energy is required. The temperature, which supplies that energy, also reduces the pore structure and the surface area. These hexaaluminates, because of the high temperature of formation, have surface areas less than 20 $m^2/g$.

Once the stabilized hexaaluminate is formed, it can be disposed on a substrate, preferably in combination with a catalyst stabilizer and optionally a catalyst for reducing the concentration of at least one exhaust component (e.g., hydrocarbons, carbon monoxide, nitrogen oxides, sulfur oxides, and the like). The catalyst stabilizer preferably comprises a material that will not dissolve into the hexaaluminate structure upon exposure to high temperatures (e.g., the temperature at which the hexaaluminate will be employed), that will not react with the hexaaluminate, and that will substantially remain in the grain boundaries (e.g., will inhibit hexaaluminate particles from agglomerating on the substrate). Possible metals for the catalyst stabilizer (e.g., grain stabilizers) include strontium, barium, hafnium, scandium, zirconium, yttrium, cerium, lanthanum, praseodymium, neodymium, and the like, as well as alloys and combinations comprising one or more of the foregoing metals. Preferred catalyst stabilizers include zirconium oxide, barium-zirconium oxide, calcium-zirconium oxide, cesium-zirconium oxide, barium aluminate, as well as combinations comprising one or more of the foregoing catalyst stabilizers. For example a catalyst stabilizer can comprise about 100 wt % zirconium oxide (based upon the total weight of the catalyst stabilizer). Alternatively, a catalyst stabilizer can comprise about 10 wt % to about 20 wt % cesium oxide and about 80 wt % to about 90 wt % zirconium oxide (based upon the total weight of the catalyst stabilizer).

Although the catalyst can be deposited onto the hexaaluminate in combination with the catalyst stabilizer as the hexaaluminate is disposed onto the substrate, the catalyst is preferably subsequently disposed on the coated substrate (or directly onto the hexaaluminate if it is the substrate), with deposition after calcination of the coated substrate particularly preferred. Various metals capable of reducing the concentration of at least one exhaust gas can be employed as the catalyst, such as precious metals, with platinum, palladium, rhodium, ruthenium, iridium, gold, and silver, as well as combinations comprising at least one of these catalysts preferred. One preferred catalyst coated substrate comprises about 0.001 wt % to about 4 wt % (with about 0.05 wt % to about 2 wt % preferred, based upon the total weight of the washcoat (catalyst, catalyst stabilizer, stabilized hexaaluminate, and solvent) ruthenium on a barium hexaaluminate coated substrate (e.g., stainless steel foil). Another preferred catalyst coated substrate comprises, about 25 grams per cubic foot ($g/ft^3$) to about 40 $g/ft^3$ palladium on a lanthanum hexaaluminate coated substrate. The hexaaluminate coated substrate can comprise, for example, a metal monolith with a washcoating comprising 90 wt % of the powder comprising of 35 $g/ft^3$ palladium on lanthanum hexaaluminate and 10 wt % of the powder comprising 14 wt % cesium oxide and 86 wt % zirconium oxide.

Deposition of the catalyst can be accomplished by various techniques, including pressurized deposition, vapor deposition, precipitation, dipping, painting, sputtering, spraying, and the like. In order to prevent the degradation of the hexaaluminate scale and to enhance the adhesion of the catalyst to the hexaaluminate, the deposition preferably occurs using a basic solution of the catalyst. Preferably, the catalyst deposition occurs at a pH above the isoelectric point of the hexaaluminate. Although a pH of greater than or equal to about 8 can be employed, a pH of greater than or equal to about 10 is preferred. High pH slurries change the hexaaluminate charge to negative while the precious metal charge remains positive. Also high pH does not dissolve or corrode the ceramic or metal substrates. Basically, precious metal precursors (e.g., the catalyst precursor) dissolved in acid solutions (e.g., a pH of less than about 7) have positive charges. Hexaaluminates and aluminum oxides (e.g., the catalyst stabilizer) in acidic solutions have positive charges. Since both species have a positive charge, there is no electrochemical attraction between the hexaaluminate and the precious metal. Consequently, the precious metal migrates and agglomerates. Such agglomeration leads to low surface area and the resulting low catalytic activity of the catalysts. Furthermore, low pH (e.g., less than or equal to about 4.0) dissolves and corrodes the ceramic and metal substrates.

Once the catalyst precursor is deposited onto the hexaaluminate, it can be reduced to the catalyst metal. Slow reduction is preferred. Oxidized precious metals, for example, are able to rapidly migrate across the support surface into large agglomerates. When the precious metal oxides are reduced to metal, the metals attach to the support surface. If the metals are formed too quickly, they will not have good intimate bonding with the stabilized hexaaluminate. If the metals are formed slowly, they form more intimate bonds, and are more catalytically active. Slow reduction can be accomplished by slow heating of the coated substrate to the desired calcining temperature (e.g., over several hours), or by "step" heating (i.e., heating to a first temperature where substantially all of the solvent (e.g., greater than or equal to about 90 wt % of the solvent is removed), to a second and higher temperature to remove various volatile compounds (e.g., nitrate or the like), and to a third and higher temperature to calcine the coating. These slow reduction processes can take several hours, e.g., up to and exceeding about 5 hours, with about 2.5 to about 3.5 hours common, while producing coatings comprising uniform catalyst loadings (e.g., less than or equal to 5% variation of the catalyst loading across the substrate). In contrast, fast reduction processes can be employed, e.g., heating to calcining temperatures within about 0.5 hours, while producing non-uniform catalyst loadings (e.g., greater than or equal to 10% variation of the catalyst loading across the substrate).

Once annealed, the hexaaluminate scale can receive a catalyst (e.g., a precious metal) precursor deposit and then be used as a catalyst in an exhaust emission control device (i.e., a gas treatment device). This can be accomplished by dipping the hexaaluminate coated substrate into a basic solution of the catalyst precursor, e.g., in a solution of ruthenium ammine hydroxide in an ammonium hydroxide solution having a pH of greater than or equal to about 10, forming a precursor coating on the scale. The catalyst precursor is then reduced to the metal. The resulting catalyst coated substrate will maintain a surface area of greater than or equal to about 40 $m^2/g$ at temperatures of up to and exceeding about 1,200° C.

Alternatively the hexaaluminate scale can receive a washcoat layer e.g., a washcoat that can be used in a gas treatment device (e.g., a close coupled catalyst); i.e., a catalyst washcoat layer (optionally comprising a hexaaluminate) can be disposed over the hexaaluminate scale oxide layer that is on the substrate. Alternatively, the substrate (e.g., having a scale oxide) can be washcoated with a solution of a catalyst precursor (e.g., a washcoat of hexaaluminate particles preferably having basic pH), other metal oxide additives, and palladium ammine hydroxide in a solution at a pH of greater than or equal to about 10. The washcoat would then be calcined at about 1,100° C. The resulting coated substrate will maintain a surface area of greater than or equal to about 40 $m^2/g$ at temperatures of up to and exceeding about 1,200° C.

In another exemplary embodiment, the hexaaluminate powder is formed in a reaction separate from the substrate. For example, the hexaaluminate can be formed by a sol gel technique. According to the sol gel technique, aluminum alkoxides, either alone or in combination with additional metal alkoxides (e.g., isopropoxides of those metals employed as crystal stabilizers above), are mixed in an acidic alcohol solution, such as isopropanol or the like. The solution is hydrolyzed to form a soluble gel. The solution is then calcined up to the temperature at which the final catalyst hexaaluminate will be employed (e.g., for an application that will see be employed at temperatures of up to 1,100° C., the soluble gel is calcined to about 1,100° C.). The calcined hexaaluminate can then be employed to coat the substrate. A specific example of this method includes dissolving aluminum metal with isopropyl alcohol making aluminum isopropoxide. Then, 87 parts aluminum isopropoxide and 13 parts barium isopropoxide are mixed. The mixture is evaporated to a gel. The gel is calcined to 1,100° C.

Once the gel has been formed, it can be deposited on the substrate with the catalyst precursor, either co-deposited or sequentially deposited. Co-deposition can be achieved by mixing the catalyst precursor into the hexaaluminate gel prior to deposition of the gel. In this method, the hexaaluminate gel can act as a binder that holds the metal oxide particles together, surrounding materials such as alkaline oxides, and preventing migration and reaction of alkaline oxides with other active components such palladium oxide, lanthanum oxide, and zirconium oxide. Limiting migration of alkaline oxides, reduces low temperature sintering.

Alternatively, the gel can be deposited on the substrate. Then a catalyst washcoat can be deposited on the substrate as described above. Preferably the washcoat is deposited on the substrate after the hexaaluminate has been calcined. The hexaaluminate layer bonds with the substrate forming a protective coating. The desired washcoat may contain alkaline metals and alkaline earths that adsorb NOx and reform hydrocarbons. Without a protective coating a high concentration of alkaline lowers the melting point of a ceramic substrate to less than or equal to about 1,200° C.

Binders may be added to enhance washcoat adhesion. Washcoat slurries with binders above a pH of 4 are greatly preferred. Soluble aluminum compounds are the most preferred binders. Any soluble inorganic material may become a binder. For example, aluminum nitrate decomposes to aluminum oxide "gluing" the metal oxide powders together. If binders are not added, usually acid or base is added to the washcoat mixture dissolving some of each of the materials. When calcined, those dissolved materials form the ceramic bonds.

As an example of a washcoat for ceramic monoliths, nitric acid and palladium nitrate are added to a mixture of barium hexaaluminate, lanthanum oxide, zirconium oxide, strontium oxide, and barium oxide. Barium nitrate, aluminum nitrate, lanthanum nitrate, zirconium nitrate and strontium nitrate are formed and in solution. When the washcoat is calcined, barium nitrate forms barium oxide bridging, aluminum nitrate forms aluminum oxide bridging etc. The palladium nitrate is deposited in the boundaries between particles.

As a second example ammonium hydroxide and palladium ammine hydroxide are added to a mixture of barium hexaaluminate, lanthanum oxide, zirconium oxide, strontium oxide and barium oxide. Barium hydroxide, aluminum hydroxide, lanthanum hydroxide, zirconium hydroxide, strontium hydroxide are formed and in the solution. When the washcoat is calcined, barium hydroxide forms barium oxide bridging, aluminum hydroxide forms aluminum oxide bridging etc.

By way of example only, and not to be limited by the example, where the hexaaluminate is applied to the substrate, it is possible for several different fractions of hexaaluminate to be applied to a single substrate. One fraction may be made by mixing alkoxides such as aluminum isopropoxide and lanthanum isopropoxide in isopropyl alcohol. Hydrolysis of the mixed metal alkoxides in acidic alcoholic solutions allows for precipitation of the hexaaluminate precursor. The lanthanum hexaaluminate is formed after calcination to at least 500° C. Deposition of a precious metal solution comprising palladium results in a highly dispersed palladium doped lanthanum-hexaaluminate. A second fraction may be made by mixing aluminum isopropoxide and barium isopropoxide, hydrolyzing and calcination. Deposition of a precious metal solution comprising ruthenium results in a highly dispersed ruthenium doped barium hexaaluminate. A third fraction may be made by mixing aluminum isopropoxide and manganese isopropoxide, hydrolyzing and calcination. Deposition of a precious metal solution comprising rhodium results in a highly dispersed rhodium doped barium hexaaluminate. The substrate may then be coated with a formulation containing about 35 weight percent (wt %) to about 65 wt % palladium doped lanthanum hexaaluminate, containing less than or equal to about 35 wt % ruthenium doped barium hexaaluminate, and containing less than or equal to about 35 wt % rhodium doped manganese hexaaluminate.

Prior to coating the substrate with the hexaaluminate washcoat, the surface of the substrate can be prepared. For example, where the substrate comprises an unoxidized metal foil, such as aluminum or aluminum intermetallic coated stainless steel metal foil, the surface of the substrate may be etched by a phosphoric, nitrate, chloride, fluoride, bromide, sulfuric, ammine or hydroxide based system, or the like, to remove contaminants. Cleaning allows pure aluminum to grow aluminum oxide whiskers and scale. Cleaning allows aluminum intermetallics to grow into aluminate whiskers and scale. Whiskers are vertical growths of that can enhance adhesion between the substrate and the washcoat formed primarily from aluminum oxide or hexaaluminate.

Depending upon the in use location of the gas treatment device, particular substrate materials can be chosen. Generally, the materials are capable of withstanding exposure to intense pulsation from the engine, abrasive wear, thermal shock, poisons, sintering aids, rich exhaust, lean exhaust, acidic gasses, hydrocarbons, nitrogen oxides, carbon monoxide, carbon dioxide, particulates, soot, sulfur oxides and water. If used in the under floor position, the substrate is stable to temperature of less than or equal to about 1,300° C. If used in the close coupled position, the substrate is stable to temperature of less than or equal to about 1,200° C., and if used in the manifold position, the substrate is stable to temperature of less than or equal to about 1,100° C. Some possible substrate materials include cordierite, silicon carbide, metal, metal oxides (e.g., alumina, and the like), glasses, and the like, and combinations comprising at least one of the foregoing materials. Some ceramic materials include "HONEY CERAM", commercially available from NGK-Locke, Inc, Southfield, Mich., and "CELCOR", commercially available from Corning, Inc., Corning, N.Y. Some metal materials include ferrous materials such as ferritic stainless steels. Ferritic stainless steels can include stainless steels such as, e.g., the 400—Series such as SS409, SS-439, and SS-441, with grade SS-409 generally preferred, as well as others. These substrate materials can be in the form of foils, porous structures (e.g., porous glasses, sponges), monoliths (e.g., a honeycomb structure, and the like), and the like, as well as combinations comprising at least one of the foregoing forms, comprising any geometry employed for substrates in gas treatment devices. Additionally, although metal foils are mostly discussed above, it is understood that ceramics and other materials can be employed, depending upon the location of the gas treatment device in the vehicle.

The substrate comprising the catalyst and hexaaluminate scale can be disposed within a housing or shell, with end plate(s), end cone(s), a manifold cover, and the like, disposed in fluid communication with the ends of the housing. The end cones or end plate can be formed integrally with the housing, e.g., using a spin forming method, or can be attached separately, e.g., by concentrically fitting the component (end cone, endplate, manifold cover, or the like) about one or both of the ends of the housing and securing it to the housing to provide a gas tight seal. The choice of material for the housing and other components, as with the substrate, depends upon the type of exhaust gas, the maximum temperature reached by the gas treatment device, the maximum temperature of the exhaust gas stream, and the like. Suitable materials for the shell and end components can be any material that is capable of resisting under-car salt, the temperature(s) and corrosion. Typically, ferrous materials are employed such as ferritic stainless steels. Ferritic stainless steels can include stainless steels such as, e.g., the 400—Series such as SS-409, SS-439, and SS-441, with grade SS-409 generally preferred.

Located between the substrate and a shell can be a retention material that insulates the shell from both the high exhaust gas temperatures and the exothermic catalytic reaction occurring within the catalyst substrate. The retention material, which enhances the structural integrity of the substrate by applying compressive radial forces about it, reducing its axial movement and retaining it in place, is typically concentrically disposed around the substrate to form a retention material/substrate subassembly.

The retention material, which can be in the form of a mat, particulates, or the like, can either be an intumescent material (e.g., a material that comprises vermiculite component, i.e., a component that expands upon the application of heat), a non-intumescent material, or a combination thereof. These materials can comprise ceramic materials and other materials such as organic binders and the like, or combinations comprising at least one of the foregoing materials. Non-intumescent materials include materials such as those sold under the trademarks "NEXTEL" by the "3M" Company, Minneapolis, Minn., SAFFIL by Saffil Ltd. England, or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

EXAMPLE 1

A cordierite monolith was coated with 7.0 $g/in^3$ slurry containing solids of barium hexaaluminate containing 0.4 wt % palladium nitrate. The monolith/washcoat was calcined at 500° C. for 4 hours. The dried and calcined monolith had a washcoat of 4.0 $g/in^3$ barium hexaaluminate and 35 $g/ft^3$ palladium, wherein the barium hexaaluminate had a surface area of 94 $m^2/g$ (meters squared per gram). (Similar results were obtained employing zirconium toughened aluminum oxide and metal monoliths.)

EXAMPLE 2

A metal monolith was coated with 7.0 $g/in^3$ slurry containing solids of 87.2 wt % barium hexaaluminate, 4 wt % barium oxide, 3 wt % strontium oxide, 3 wt % lanthanum oxide, 2 wt % zirconium oxide and 0.8 wt % palladium nitrate. The monolith with washcoat was calcined at 500° C. for 4 hours. The finished monolith had a washcoat of 3.52 $g/in^3$ barium hexaaluminate, 0.16 $g/in^3$ barium oxide, 0.12 $g/in^3$ strontium oxide, 0.12 $g/in^3$ lanthanum oxide, 0.08 $g/in^3$ zirconium oxide and 35 $g/ft^3$ palladium, wherein the barium hexaaluminate with zirconia stabilizers and palladium had a surface area of 127 $m^2/g$.

EXAMPLE 3

A metal monolith was coated with 7.0 $g/in^3$ slurry containing solids of 45.5 wt % barium hexaaluminate, 44.7 wt % lanthanum hexaaluminate, 4 wt % barium oxide, 3 wt % strontium oxide, 2 wt % zirconium oxide, 0.8 wt % ruthenium nitrate. The monolith with washcoat was calcined at 500° C. for 4 hours. The finished monolith had a washcoat of 3.52 $g/in^3$ barium hexaaluminate, 0.16 $g/in^3$ barium oxide, 0.12 $g/in^3$ strontium oxide, 0.12 $g/in^3$ lanthanum oxide, 0.08 $g/in^3$ zirconium oxide, 35 $g/ft^3$ ruthenium, wherein the barium hexaaluminate and lanthanum hexaaluminate with zirconia stabilizers and ruthenium had a surface area of 138 $m^2/g$.

EXAMPLE 4

A metal monolith was coated with 7.0 $g/in^3$ slurry containing solids of 90.2 wt % praseodymium-manganese hexaaluminate, 4 wt % barium oxide, 3 wt % strontium oxide, 2 wt % zirconium oxide, 0.8 wt % rhodium nitrate. The monolith with washcoat was calcined at 500° C. for 4 hours. The finished monolith had a washcoat of 3.52 $g/in^3$ barium hexaaluminate, 0.16 $g/in^3$ barium oxide, 0.12 $g/in^3$ strontium oxide, 0.12 $g/in^3$ lanthanum oxide, 0.08 $g/in^3$ zirconium oxide and 35 $g/ft^3$ rhodium, wherein the manganese hexaaluminate with zirconia stabilizers and rhodium had a surface area of 83 $m^2/g$.

EXAMPLE 5

Barium hexaaluminate powder was doped with rhodium nitrate and calcined at 500° C. for 4 hours. A 0.40 wt % loading of rhodium was obtained after calcination. Lanthanum hexaaluminate powder was doped with palladium nitrate and calcined at 500° C. for 4 hours. A 0.40 wt % palladium loading was obtained after calcination. A metal monolith was coated with a zirconium phosphate solution then calcined at 500° C. for 4 hours. The metal monolith with zirconium phosphate layer was coated with 7.0 $g/in^3$ slurry containing solids of 45.5 wt % rhodium doped barium hexaaluminate, 44.7 wt % palladium doped lanthanum hexaaluminate, 4 wt % barium oxide, 3 wt % strontium oxide, 2 wt % potassium oxide and 2 wt % zirconium oxide. The monolith with washcoat was calcined at 500° C. for 4 hours. The finished monoliths had a washcoat of 1.78 $g/in^3$ barium hexaaluminate, 1.74 $g/in^3$ lanthanum hexaaluminate, 0.16 $g/in^3$ barium oxide, 0.12 $g/in^3$ strontium oxide, 0.12 $g/in^3$ lanthanum oxide, 0.08 $g/in^3$ zirconium oxide and 35 $g/ft^3$ palladium and 35 $g/ft^3$ rhodium, wherein the barium hexaaluminate-rhodium had a surface area of 94 $m^2/g$ and the lanthanum hexaaluminate-palladium had a surface area of 105 $m^2/g$.

The use of a hexaaluminate as a catalyst, particularly as a catalyst in manifold-positioned catalytic converters, has several advantages. One such advantage is that the hexaaluminate can avoid sintering at higher temperatures than can aluminum oxide. Thereby enhancing resistance of the catalyst and monolithic support and increases the durability of the gas treatment device. An additional advantage is that lesser amounts of precious metal oxides need be deposited onto the hexaaluminate, while retaining similar activity. In an aluminum oxide catalytic converter, about 80 grams per cubic foot (g/ft$^3$) to about 300 g/ft$^3$ of precious metal is employed with a typical loading of 130 g/ft$^3$ for an aluminum oxide washcoat. (e.g., to have sufficient activity to reduce one or more of the exhaust gas components to a desired level). Where an aluminum oxide enhanced with barium or lanthanum is employed, a precious metal oxide loading of about 50 g/ft$^3$ to about 100 g/ft$^3$ is employed to attain a similar activity with typical loading of 80 g/ft$^3$ for a barium stabilized aluminum oxide washcoat. In contrast, when a hexaaluminate is employed, with one or more stabilizers a precious metal oxide loading of about 20 g/ft$^3$ to about 60 g/ft$^3$ is employed to attain a similar activity with typical loading of 40 g/ft$^3$ for a barium hexaaluminate washcoat.

Precious metal reductions are possible because the hexaaluminate is less prone to sintering than are alumina or stabilized alumina. The precious metal is less likely to be trapped in the collapsed pores of hexaaluminates. Also, the stabilizers prevent migration of precious metal oxides. Therefore, less precious metal oxides can be employed to the substrate, while attaining similar activity. The reduction in the catalyst loading enables a significant cost reduction in the production of the gas treatment device. Preferably, catalyst loadings of less than or equal to about 80 g/ft$^3$ will be employed, with loadings of less than or equal to about 65 g/ft$^3$ preferred, less than or equal to about 50 g/ft$^3$ more preferred, and less than or equal to about 40 g/ft$^3$ especially preferred to attain SULEV hydrocarbon activities of less than 0.01 grams per mile (g/mi) HC on the US Federal Test Procedure (FTP) after 120,000 miles of aging.

Additionally, an aluminum oxide without stabilizer(s) in the crystalline structure exposed to a temperature of less than 1,050° C. has a surface area of about 100 square meters per gram (m$^2$/g) to about 120 m$^2$/g. When exposed to temperatures of 1,050° C., however, the surface area decreases to about 20 m$^2$/g. In contrast, a hexaaluminate comprising a stabilizer such as, barium or lanthanum, in the crystalline structure, retains a surface area of about 100 m$^2$/g at temperatures of less than and equal to about 1,300° C. Additionally, at temperatures of less than and equal to about 1,600° C., a surface area of greater than or equal to about 30 m$^2$/g is retained, with greater than or equal to about 40 m$^2$/g possible.

Aluminum isopropoxide and barium isopropoxide solutions mixed and co-fired have surface area of 150 meters squared per gram up to 1,300° C. Aluminum oxide from aluminum isopropoxide, with no barium present, has surface area of 150 meters squared per gram only up to about 960° C. Aluminum oxide from aluminum isopropoxide, in the presence of barium oxide has surface area of 150 meters squared per gram only up to temperatures of about 880° C.

A significant amount (e.g., greater than about 10%) of manifold coupled converters may have to be replaced due to substrate melting. For metal monoliths the alkaline oxides react with the aluminum oxide scale destroying the protective properties of the scale layer. With the aluminate scale protective layer gone, the stainless steel foil easily oxidizes and loses washcoat adhesion at temperatures of around 900° C. With the hexaaluminate, the converters can be employed for extended periods of time, e.g., for well over 50,000 vehicle starts.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A gas treatment device, comprising:
   a housing;
   a substrate disposed within the housing, the substrate comprising a coating comprising
   a catalyst selected from the group consisting of platinum, palladium, rhodium, ruthenium, iridium, gold, silver, and combinations comprising at least one of these catalysts,
   a hexaaluminate comprising a crystal stabilizer disposed in a hexaaluminate crystalline structure, said crystal stabilizer being selected from the group consisting of barium, lanthanum, strontium, ruthenium, and combinations comprising at least one of the foregoing crystal stabilizers; and
   a catalyst stabilizer selected from the group consisting of calcium-zirconium oxide, cesium-zirconium oxide, barium-zirconium oxide, and combinations comprising at least one of the foregoing catalyst stabilizers.

2. The gas treatment device of claim 1, wherein the catalyst comprises platinum.

3. The gas treatment device of claim 1, wherein the substrate comprises a metal foil.

4. The gas treatment device of claim 1, wherein the catalyst stabilizer is cesium-zirconium oxide comprising about 10 wt % to about 20 wt % cesium oxide and about 80 wt % to about 90 wt % zirconium oxide, based upon a total weight of the catalyst stabilizer.

5. The gas treatment device of claim 1, further comprising a retention material disposed between the housing and the substrate.

6. The gas treatment device of claim 1, wherein the catalyst comprises palladium in an amount of about 25 g/ft$^3$ to about 40 g/ft$^3$, and wherein the crystal stabilizer selected from the group consisting of lanthanum and barium.

7. A gas treatment device, comprising:
   a housing;
   a metal foil disposed within the housing and comprising a coating, and
   a retention material disposed between the housing and the substrate; wherein the coating comprises
   a catalyst selected from the group consisting of platinum, palladium, rhodium, ruthenium, iridium, gold, silver, and combinations comprising at least one of these catalysts;
   a hexaaluminate comprising a crystal stabilizer disposed in a hexaaluminate crystalline structure, said crystal stabilizer being selected from the group consisting of barium, lanthanum, strontium, ruthenium, and combinations comprising at least one of the foregoing crystal stabilizers; and
   a catalyst stabilizer selected from the group consisting of calcium-zirconium oxide, cesium-zirconium oxide, barium-zirconium oxide, and combinations comprising at least one of the foregoing catalyst stabilizers.

8. A vehicle exhaust system, comprising:
   an engine;
   a gas treatment device disposed downstream from the engine, the gas treatment device comprising a housing, a substrate disposed within the housing, the substrate comprising a coating comprising a catalyst selected from the group consisting of platinum, palladium, rhodium, ruthenium, iridium, gold, silver, and combinations comprising at least one of these catalysts:

a hexaaluminate comprising a crystal stabilizer disposed in a hexaaluminate crystalline structure, said crystal stabilizer being selected from the group consisting of barium, lanthanum, strontium, ruthenium, and combinations comprising at least one of the foregoing crystal stabilizers; and a catalyst stabilizer selected from the group consisting of calcium-zirconium oxide, cesium-zirconium oxide, barium-zirconium oxide, and combinations comprising at least one of the foregoing catalyst stabilizers.

9. The vehicle exhaust system of claim 8, wherein the gas treatment device is located in the manifold position, and the substrate comprises metal foil.

10. The vehicle exhaust system of claim 9, wherein the gas treatment device is located in the close-coupled position, and the substrate comprises metal foil.

* * * * *